United States Patent
Bono et al.

(10) Patent No.: US 9,720,596 B1
(45) Date of Patent: Aug. 1, 2017

(54) COALESCING WRITES FOR IMPROVED STORAGE UTILIZATION

(71) Applicant: EMC Corporation, Hopkinton, MA (US)

(72) Inventors: Jean-Pierre Bono, Westborough, MA (US); Philippe Armangau, Acton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 115 days.

(21) Appl. No.: 14/576,952

(22) Filed: Dec. 19, 2014

(51) Int. Cl.
G06F 12/10 (2016.01)
G06F 3/06 (2006.01)

(52) U.S. Cl.
CPC ............ *G06F 3/0608* (2013.01); *G06F 3/064* (2013.01); *G06F 3/0689* (2013.01); *G06F 2212/7201* (2013.01)

(58) Field of Classification Search
CPC ........... G06F 12/0246; G06F 17/30067; G06F 11/1076; G06F 3/061; G06F 3/0688; G06F 2211/1028; G06F 3/0689; G06F 3/067; G06F 2212/7208; G06F 3/0614; G06F 3/0665; G06F 12/0871; G06F 3/0608; G06F 12/0833; G06F 2212/69; G06F 17/30; G06F 12/10; G06F 2212/7201; G06F 3/064
See application file for complete search history.

(56) References Cited

U.S. PATENT DOCUMENTS

| | | | |
|---|---|---|---|
| 7,631,155 B1 | 12/2009 | Bono et al. | |
| 8,661,068 B1 | 2/2014 | Seibel et al. | |
| 9,069,682 B1 | 6/2015 | Veeraswamy | |
| 9,122,589 B1 | 9/2015 | Bono et al. | |
| 9,122,614 B1 * | 9/2015 | Kesavan | G06F 3/0656 |
| 9,146,928 B1 | 9/2015 | Noveck | |
| 9,280,578 B1 | 3/2016 | Zhou et al. | |
| 9,286,007 B1 | 3/2016 | Bono | |
| 2003/0182502 A1 * | 9/2003 | Kleiman | G06F 3/0613 |
| | | | 711/114 |
| 2004/0193796 A1 * | 9/2004 | Takamoto | G06F 3/0617 |
| | | | 711/113 |
| 2008/0077762 A1 * | 3/2008 | Scott | G06F 3/0608 |
| | | | 711/170 |
| 2009/0271562 A1 * | 10/2009 | Sinclair | G06F 12/0246 |
| | | | 711/103 |
| 2015/0193338 A1 * | 7/2015 | Sundaram | G06F 3/0688 |
| | | | 711/103 |

* cited by examiner

*Primary Examiner* — Hashem Farrokh
(74) *Attorney, Agent, or Firm* — BainwoodHuang

(57) ABSTRACT

A technique for managing a data storage system that stores data in a set of RAID groups includes receiving IO requests specifying data to be written at different logical addresses and mapping the specified data to contiguous physical addresses, so as to produce contiguously-mapped data having a length equal to that of a full stripe of a RAID group. With data from the IO requests mapped to a contiguous, full-stripe range, the data storage system can write the data and its parity to a full stripe of the RAID group in a single set of operations.

21 Claims, 7 Drawing Sheets

COALESCING WRITES FOR IMPROVED STORAGE UTILIZATION

BACKGROUND

Data storage systems are arrangements of hardware and software that typically include multiple storage processors coupled to arrays of non-volatile storage devices, such as magnetic disk drives, electronic flash drives, and/or optical drives, for example. The storage processors service storage requests that arrive from host machines and that specify files or other data elements to be written, read, created, or deleted, for example. The storage processors run software that manages incoming storage requests and performs various data processing tasks to organize and secure data stored on the non-volatile storage devices.

Data storage systems commonly employ RAID technology to protect the data they store. RAID is an acronym for "Redundant Array of Independent Disks." A data storage system may include multiple RAID groups, where each RAID group is formed from multiple disk drives. A RAID group may divide its participating disk drives into segments and form multiple RAID stripes across corresponding segments on different drives. In some examples, one or more segments in a RAID stripe stores parity information. In the event of a disk failure that affects one of the segments in the RAID stripe, the RAID group can reconstruct the damaged segment using the data and parity information from the remaining segments. It is common practice to arrange segments in RAID stripes so as to promote fast disk access. For example, a RAID group may interleave access to segments on different disk drives to improve overall performance.

SUMMARY

Although data striping in RAID groups can allow data storage systems to access data at higher speeds, the increases in speed often have premature limits. For example, data storage systems that provide RAID stripes with parity segments must read, recompute, and write back parity information each time the data in any of the non-parity segments change. In a limiting case, each IO (input/output) request received from a host that specifies data that is written to a RAID stripe may entail an associated read and write of parity to that stripe. This requirement to read and write parity upon each change in data greatly increases the number of disk IOs that the RAID group must perform. In data storage systems that already utilize their RAID groups at or near full capacity, i.e., to satisfy IO requests from hosts, the additional disk IO required to maintain parity can cause disk drives prematurely to become IO bound. To overcome this barrier and to provide highest levels of performance, data storage systems may incorporate additional disk drives to help share the load. However, adding disk drives increases a system's cost, power, and complexity. What is needed, therefore, is a way to utilize disk drives more efficiently to prevent their becoming prematurely IO bound and to avoid having to incur the cost, power, and complexity of incorporating additional disk drives.

In contrast with the above-described approach, in which disk drives of RAID groups may prematurely become IO bound due to large numbers of parity updates, an improved technique for managing data storage in a data storage system includes receiving IO requests specifying data to be written at different logical addresses and mapping the specified data to contiguous physical addresses, so as to produce contiguously-mapped data having a length equal to that of a full stripe of a RAID group. With data from the IO requests mapped to a contiguous, full-stripe range of physical addresses, the data storage system can write the data and its parity to the full stripe of the RAID Group all at once. This coalescing of data into full-stripe writes utilizes disk drives more efficiently and greatly reduces the number of disk accesses required to maintain parity. For example, rather than the data storage system having to write a parity segment for each IO request serviced by a stripe, the data storage system can instead write the parity once for many of the IO requests serviced by the stripe. Thus, the improved technique greatly reduces the number of disk accesses for maintaining parity and allows the disk drives in RAID groups to spend more of their IO capacity on servicing host requests and less on maintaining parity. Overall disk utilization is therefore improved without the need to incorporate additional disk drives.

In some examples, the data storage system preserves fast response times to hosts by caching host IO requests in a high-speed, persistent cache and acknowledging completion to the hosts prior to mapping the logical addresses to contiguous physical addresses. Mapping to support full-stripe writes can operate in the background, out of band with incoming IO requests, thus enabling the data storage system to provide both fast response times to IO requests and efficient utilization of storage.

Certain embodiments are directed to a method of managing storage for a data object in a data storage system. The method includes realizing the data object in a file stored in a file system of the data storage system, the file having a logical address space, the file system mapping the logical address space to multiple physical addresses backed by a set of RAID groups (Redundant Array of Independent Disks) providing storage for the file system in a set of RAID-protected stripes. The method further includes receiving IO requests specifying a set of data to be written to the data object at multiple logical addresses of the file, where the logical addresses are mapped by the file system to non-contiguous physical addresses. The method further includes remapping the logical addresses to a range of contiguous physical addresses in the file system. The range of contiguous physical addresses has a length equal to that of a full stripe of the set of RAID-protected stripes. The method still further includes computing parity for the set of data and writing the set of data and the parity to a full stripe of the set of RAID-protected stripes.

Other embodiments are directed to a data storage system constructed and arranged to perform a method of managing storage for a data object, such as the method described above. Still other embodiments are directed to a computer program product. The computer program product stores instructions which, when executed on one or more processing units of a data storage system, cause the processing units to perform a method of managing storage for a data object, such as the method described above. Some embodiments involve activity that is performed at a single location, while other embodiments involve activity that is distributed over multiple locations, e.g., over a network.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for managing a data storage system that stores data in a set of RAID groups includes receiving IO requests specifying data to be written at different logical addresses and mapping the specified data to contiguous physical addresses, so as to produce contiguously-mapped data having a length equal to that of a full stripe of a RAID group. With data from the IO requests mapped to a contiguous, full-stripe range, the data storage system can write the data and its parity to a full stripe of the RAID group all at once, thereby improving disk utilization.

Figure 1:
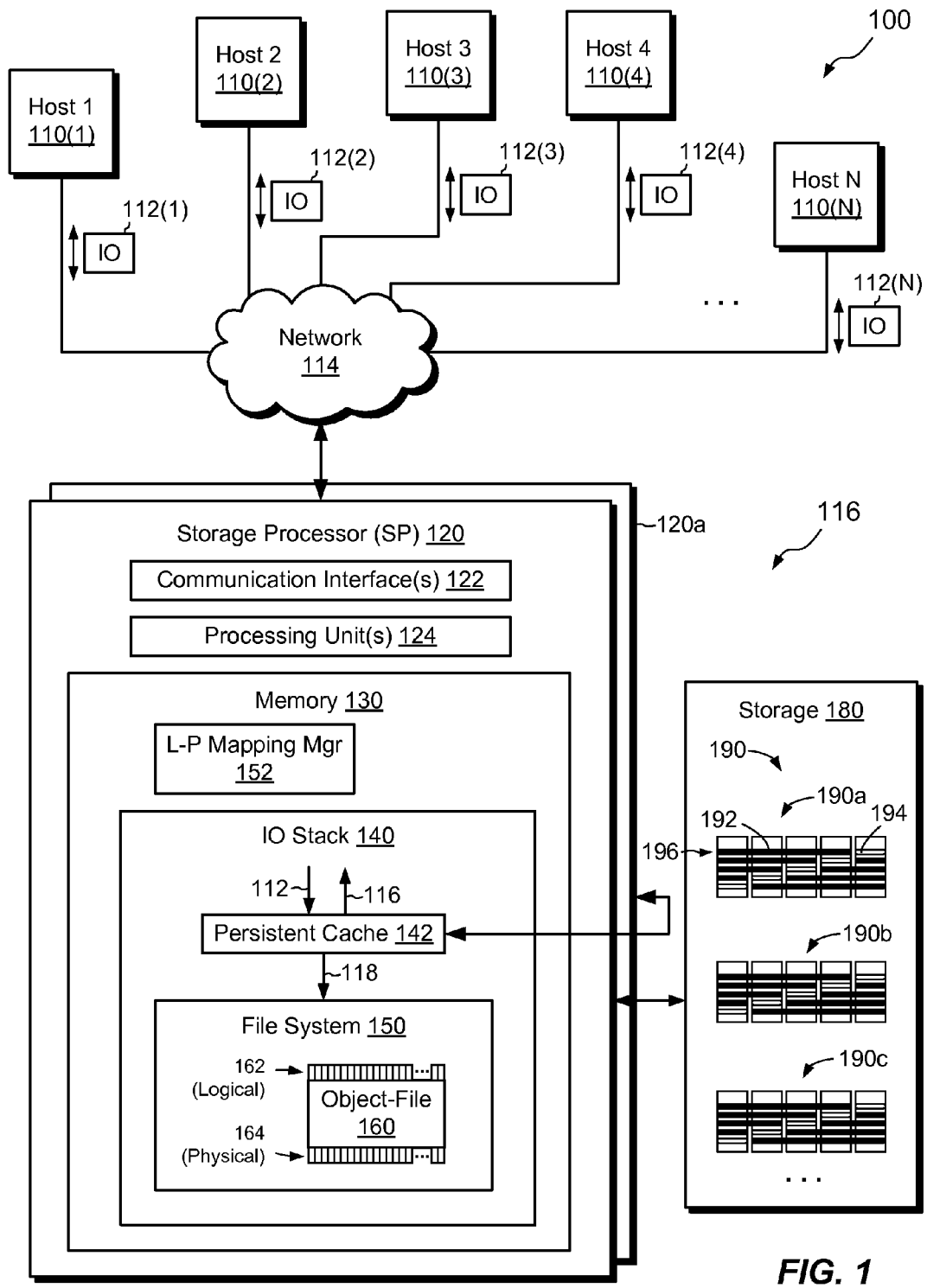
FIG. 1 is a block diagram showing an example environment in which techniques hereof may be practiced, where the environment includes a data storage system having storage processors, multiple RAID groups for storing data, and a logical-to-physical (L-P) mapping manager for mapping logical addresses of files to contiguous physical addresses.

FIG. 1 shows an example environment 100 in which embodiments of the improved technique hereof can be practiced. Here, multiple host computing devices ("hosts"), shown as devices 110(1) through 110(N), access a data storage system 116 over a network 114. The data storage system 116 includes a storage processor, or "SP," 120 and storage 180. The data storage system 116 may include multiple SPs like the SP 120 (e.g., a second SP, 120a). In an example, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs, including a single SP, may be provided and the SP 120 can be any type of computing device capable of processing host IOs.

In an example, the storage 180 takes the form of RAID groups 190a, 190b, and 190c (collectively, 190), where each RAID group is composed of multiple disk drives. The disk drives may include magnetic disk drives, electronic flash drives, optical drives, and/or other types of drives. In a typical example, each of the RAID groups 190 includes disk drives of a common type that provide similar performance. Each of the RAID groups 190 is seen to include five disk drives and five stripes. Each stripe 196 is shown as a horizontal band across all of the disk drives in a RAID group and includes four data segments 192 and a single parity segment 194. Segments may be of any suitable size, such as 64 KB, for example, such that each stripe has a length of 256 KB (parity is generally not counted when measuring stripe length). Other RAID configurations may be used, including those with a different number of disk drives per RAID group, different numbers and/or sizes of data and/or parity segments, and/or different numbers of stripes. Any number of RAID groups may be provided, including a single RAID group. The example shown is thus intended to be merely illustrative.

The network 114 can be any type of network or combination of networks, such as a storage area network (SAN), a local area network (LAN), a wide area network (WAN), the Internet, and/or some other type of network or combination of networks, for example. The hosts 110(1-N) may connect to the SP 120 using various technologies, such as Fibre Channel, iSCSI, NFS, SMB 3.0, and CIFS, for example. Any number of hosts 110(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. The SP 120 is configured to receive IO requests 112(1-N) according to both block-based and file-based protocols and to respond to such IO requests 112(1-N) by reading or writing the storage 180.

The SP 120 is seen to include one or more communication interfaces 122, a set of processing units 124, and memory 130. The communication interfaces 122 include, for example, SCSI target adapters and network interface adapters for converting electronic and/or optical signals received over the network 114 to electronic form for use by the SP 120. The set of processing units 124 includes one or more processing chips and/or assemblies. In a particular example, the set of processing units 124 includes numerous multi-core CPUs. The memory 130 includes both volatile memory (e.g., RAM), and non-volatile memory, such as one or more ROMs, disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons.

As further shown in FIG. 1, the memory 130 includes (i.e., realizes by operation of programming code) an IO stack 140 and an L-P (Logical-to-Physical) mapping manager 152. The IO stack 140 provides an execution path for host IOs (e.g., IO requests 112(1-N)). The L-P mapping manager 152 provides mapping services for data objects to promote full-stripe mapping.

The IO stack 140 is seen to include a persistent cache 142 and a file system 150. The file system 150 realizes a data object in the form of an object-file 160. The data object may itself take the form of a LUN (Logical Unit Number), a host file system, a VVol (virtual volume, available from VMware, Inc. of Palo Alto, Calif.), or some other data object, for example. Mapping within the IO stack 140 converts IO requests to corresponding reads and writes of the underlying object-file 160. The object-file 160 has a logical address space 162 and a set of associated physical addresses 164. In an example, the logical address space 162 is a monotonic range of logical offsets into the object-file 160, e.g., as tracked by an inode structure of the object-file 160 in the file system 150. The physical addresses 164 are particular addresses of blocks that the file system 150 uses to store data of the object-file 160. In an example, the physical addresses 164 are identified by file system block number (FSBN).

In an example, the persistent cache 142 is implemented in DRAM (Dynamic Random Access Memory). The DRAM is mirrored to DRAM on at least one other SP (e.g., on SP 120a), and the DRAM on both SPs is backed up by battery. The contents of the cache 142 thus persist on at least two SPs, even in the event of a power loss. The persistent cache 142 thus provides the speed characteristics of DRAM while also providing persistence not normally found with DRAM.

In example operation, the hosts 110(1-N) issue IO requests 112(1-N) to the data storage system 116. The SP 120 receives the IO requests 112(1-N) at the communication interfaces 122 and passes the IO requests to the IO stack 140 for further processing. The IO requests 112(1-N) include IO requests 112 specifying data to be written to the data object. For each IO request 112, the persistent cache 142 stores the data specified in the IO request 112. The persistent cache 142 also provides an acknowledgment 116 once the data specified in the IO request 112 have been securely stored (e.g., saved to battery-backed DRAM on the SP 120 and successfully mirrored to battery-backed DRAM on SP 120a). The acknowledgement 116, which indicates successful completion of the IO request 112, propagates back to the originating host, e.g., back to one of the hosts 110(1) to 110(N). The above process may be repeated for additional IO requests 112 specifying additional data to be written to various locations of the data object. The persistent cache 142 accumulates the data specified in these IO requests 112, e.g., in the order received, and provides an acknowledgement 116 in response to each one.

The IO requests 112 specify not only the data to be written but also the locations of the data to be written relative to the data object. For example, if the data object is a LUN, the IO request 112 may specify the location of the data as an offset into the LUN. If the data object is a host file system, the IO request 112 may specify the location of the data by file name and an offset into the named file. As will be described, the IO stack 140 maps these various location indicators to a set of logical offsets within the object-file 160. The file system 150 further maps these logical offsets to physical addresses (among the addresses 164) of blocks at specified FSBNs. In some cases, the data to be written are directed to blocks that have already been allocated and mapped by the file system 150, such that the data writes prescribe overwrites of existing blocks. In other cases, the data to be written do not yet have any associated physical storage, such that the file system must allocate new blocks to the object-file 160 to store the data.

At some point in the course of accumulating data from IO requests 112, and out of band with the processing of particular IO requests 112, the persistent cache 142 performs a flushing operation 118 to send the accumulated data, or portions thereof, to the file system 150 for organizing and incorporating the data into the storage 180. The file system 150, upon receiving the flushed data, invokes the L-P mapping manager 152. The L-P mapping manager 152 makes a determination as to whether to organize file mapping in such a way as to promote full-stripe writes. The L-P mapping manager 152 may make its determination selectively based on multiple factors, such as the amount of available contiguous free space in the RAID groups 190 and on a metadata processing workload currently being handled by the file system 150. If the L-P mapping manager 152 determines that no remapping should be performed, e.g., based on current circumstances, then the file system 150 processes the data flushed from the persistent cache 142 in its usual way, e.g., without regard to full-stripe writes.

However, if the L-P mapping manager 152 determines that mapping should be performed to promote full-stripe writes, then the L-P mapping manager 152 directs the file system 150 to perform data and metadata operations to arrange the data being flushed from the persistent cache 142 in contiguous physical addresses. For example, the L-P mapping manager 152 may direct the file system 150 to allocate a range of contiguous free blocks to the file system 150, where the range of contiguous free blocks has a length equal to that of a full-stripe (e.g., a length of 256 KB, given the example numbers above). In the case of overwrites, the L-P mapping manager 152 may direct the file system 150 to update block pointers for the object-file 160 so that the logical addresses of the flushed data point to the physical addresses of the newly allocated contiguous range of blocks, rather than pointing to their original locations, which may be randomly distributed throughout the physical address space. Blocks pointed away from may be freed and made available for other use. The L-P mapping manager 152 then directs the file system 150 to write the flushed data to the newly allocated blocks in accordance with the updated mapping. Lower levels of the IO stack 140 then effect a write operation on an available full stripe of a RAID group (one of 190a, 190b, and 190c), e.g., with data written to the stripe in the same order in which they are mapped in the physical addresses in the file system 150. The L-P mapping manager 152 thus converts data writes directed to arbitrary logical addresses in the object-file 160 into contiguous writes of full-stripe size, which lower levels of the IO stack 140 apply to RAID groups 190 as full-stripe writes.

It should be understood that the L-P mapping manager 152 may coalesce data writes covering lengths greater than one full stripe. For example, the L-P mapping manager 152 may aggregate data being flushed from the persistent cache 142 into contiguous ranges having lengths equal to any integer number of full stripes. In such cases, lower levels of the IO stack 140 can perform multiple full-stripe writes on the remapped data.

The data storage system 116 may also invoke the L-P mapping manager 152 when performing allocating writes, i.e., writes that enlarge the logical address space 162 of the object-file 160. Such writes may cause the file system 150 to allocate new blocks for storing additional content and to add new block pointers to point to the newly allocated blocks. In accordance with improvements hereof, the IO stack 140 invokes the L-P mapping manager 152 in these instances as well. For example, the L-P mapping manager 152, when active, directs the file system 150 to allocate a range of blocks at contiguous physical addresses having length equal to that of a full stripe, or an integer number of full stripes.

Lower levels of the IO stack 140 then operate to effect full-stripe writes of the new data on the RAID groups 190.

Of course, the data flushed from the persistent cache 142 may include a mixture of data to be overwritten and data that require new blocks to be allocated. In these examples, the L-P mapping manager 152 behaves as described above in the respective cases. When the L-P mapping manager 152 determines that it should act to promote full-stripe writes, the L-P mapping manager 152 may direct the file system 150 to allocate new blocks over a range equal to an integer number of full stripes and to remap and map as required for overwrites and for allocating writes, respectively.

Figure 2:
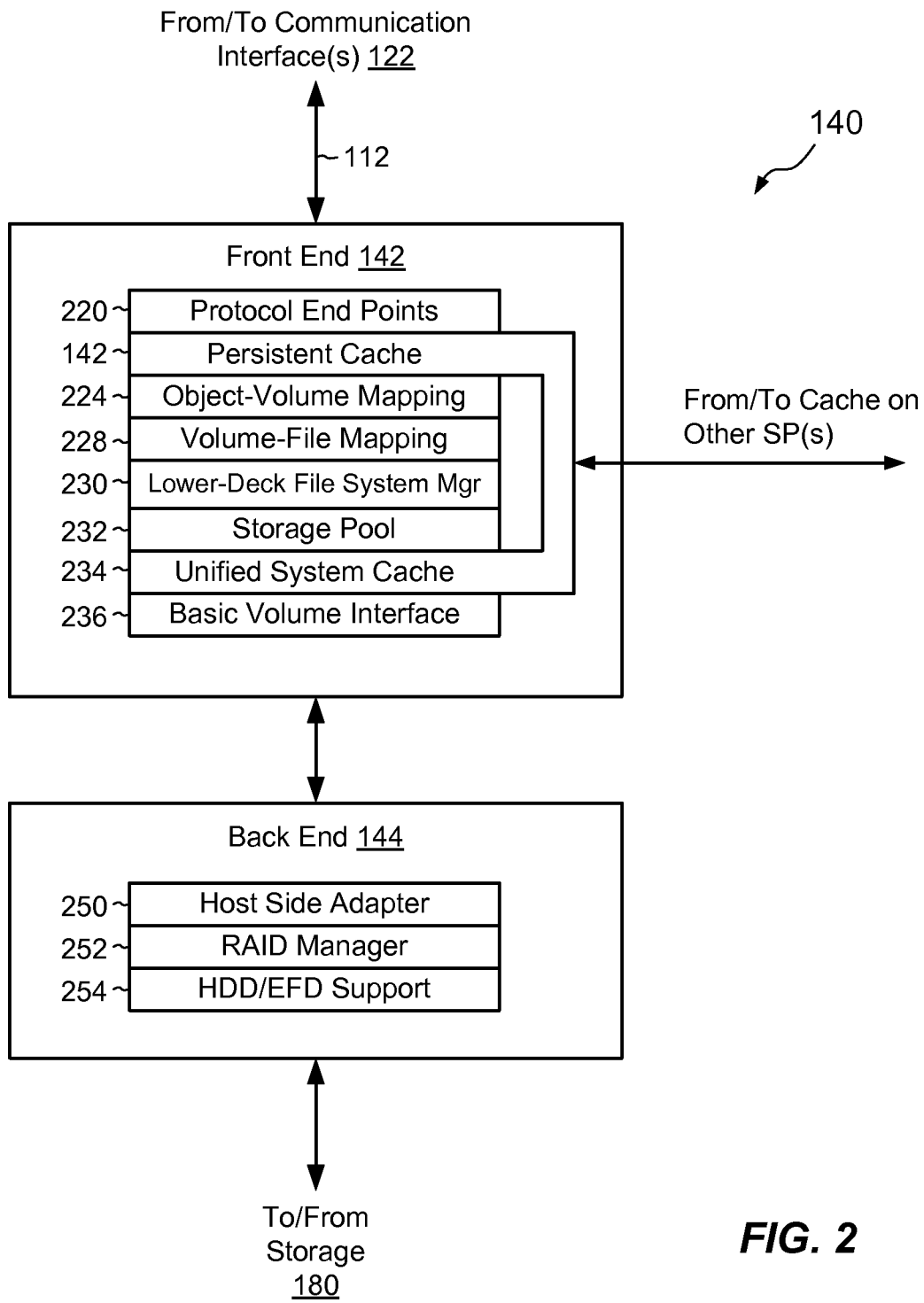
FIG. 2 is a block diagram showing an example IO stack of a storage processor of FIG. 1 in additional detail.

FIG. 2 shows the example IO stack 140 of FIG. 1 in additional detail. Here, the IO stack 140 is seen to include a front end 142 and a back end 144. The front end 142 and back end 144 may be operated together on the same SP, as they are in FIG. 1, or may be operated on different SPs, e.g., in a modular arrangement. Further, the front end 142 may be connected directly to a separate block-based array, e.g., in a gateway arrangement, with back-end functionality provided by the block-based array.

The front end 142 is seen to include protocol end points 220, the persistent cache 142, an object-volume mapping layer 224, a volume-file mapping 228, a lower-deck (internal) file system manager 230, a storage pool 232, a unified system cache 234, and a basic volume interface 236. For reasons that will become apparent, the persistent cache 142 is shown as an extension of the unified system cache 234.

The back end 144 is seen to include a host side adapter 250, a RAID manager 252, and hard disk drive/electronic flash drive support 254. Although IO requests 112 enter the IO stack 140 from the top and propagate down (from the perspective of FIG. 2), the components of the IO stack 140 are described herein from the bottom to the top to promote ease of understanding.

At the back end 144, the hard disk drive/electronic flash drive support 254 includes drivers that perform the actual reading from and writing to the magnetic disk drives, electronic flash drives, etc., in the storage 180. The RAID manager 252 arranges the storage media into RAID groups 190 and provides access to the RAID groups 190 using RAID protocols. The host side adapter 250 provides an interface to the front end 142, for implementations in which the front end 142 and back end 144 run on different machines or SPs. When the front end 142 and back end 144 are co-located on the same SP, as they are in FIG. 1, the host side adapter 250 may be omitted or disabled.

Continuing to the front end 142, the basic volume interface 236 provides an interface to the back end 144 for instances in which the front end 142 and back end 144 are run on different machines or SPs. The basic volume interface 236 may be disabled in the arrangement shown in FIG. 1.

The unified system cache 234 provides caching services for underlying RAID groups 190. In an example, the IO stack 140 provides a LUN-based interface for each RAID group 190 to enable the RAID group to be accessed using LUN semantics. RAID groups 190 accessed through these interfaces are referred to as "classic LUNs" or "Flare LUNs." In an example, portions of the unified system cache 234 are organized by Flare LUN, e.g., with the IO stack 140 reading and writing to these portions of the unified system cache 234 by specifying a particular Flare LUN and an offset range.

The storage pool 232 organizes elements of the storage 180 in the form of slices. A "slice" is an increment of storage space, such as 256 MB or 1 GB in size, which is composed from a portion of a Flare LUN (i.e., of a RAID group). The pool 232 may allocate slices to lower-deck file systems to support the storage of data objects. The pool 232 may also deallocate slices from lower-deck file systems if storage provided by the slices is no longer required.

The lower-deck file system manager 230 builds and manages internal, lower-deck file systems (like the file system 150) upon slices served by the storage pool 232. Lower-deck file systems can realize both block-based objects and file-based objects in the form of files (container files). The data storage system 116 may include any number of lower-deck file systems, and each lower-deck file system may include any number of files. In a typical arrangement, a different lower-deck file system is provided for each data object to be stored. Each lower-deck file system includes one file that realizes the data object itself and, in some instances, other files that realize snaps of the file that stores the data object. Some implementations allow for storing additional files. Each of the lower-deck file systems has an inode table. The inode table provides a different inode for each file stored in the respective lower-deck file system. Each inode stores properties of a respective file, such as its ownership, and includes and/or points to block pointers that map logical addresses of the file to physical addresses of blocks that store the file's data. A "block" is the smallest allocatable unit of storage, which may be, for example, 8 KB in size. Blocks may be of sizes different from 8 KB, however, and a data storage system may use blocks of different sizes for storing different types of data and/or metadata.

The volume-file mapping 228 maps each file representing a data object to a respective internal volume. Higher levels of the IO stack 140 can then access the internal volume using block-based semantics. The volume-file mapping can be achieved in a variety of ways. According to one example, a file representing a data object is regarded as a range of blocks, and the range of blocks can be expressed as a corresponding range of offsets into the file. Because volumes are accessed based on starting location (logical unit number) and offsets into the volume, the volume-file mapping 228 can establish a one-to-one correspondence between offsets into the file and offsets into the corresponding internal volume, thereby providing the requisite mapping needed to express the file in the form of a volume.

The object-volume mapping layer 224 maps internal volumes to respective data objects accessible to hosts, such as LUNs, host file systems, and VVols, for example. For LUNs, object-volume mapping may involve a simple remapping from a format compatible with the internal volume to a format compatible with the LUN. In some examples, no remapping is needed. For host file systems, object-volume mapping may be accomplished in part by leveraging from the fact that file systems are customarily built upon volumes, such that an underlying volume is part of the structure of any host file system. Host file systems, also called "upper-deck file systems," are thus built upon the internal volumes presented by the volume-file mapping 228 to provide hosts with access to files and directories. Mapping of VVols can be achieved in similar ways. For block-based VVols, the object-volume mapping layer 224 may perform mapping substantially as it does for LUNs. For file-based vVOLs, the object-volume mapping layer 224 may perform mapping by converting host-specified offsets into VVol files to corresponding offsets into internal volumes.

The protocol end points 220 expose the underlying data objects to hosts in accordance with respective protocols for accessing the data objects. Thus, the protocol end points 220 may expose block-based objects (e.g., LUNs and block-based VVols) using Fiber Channel or iSCSI and may expose file-based objects (e.g., host file systems and file-based VVols) using NFS, CIFS, or SMB 3.0, for example.

Figure 3:
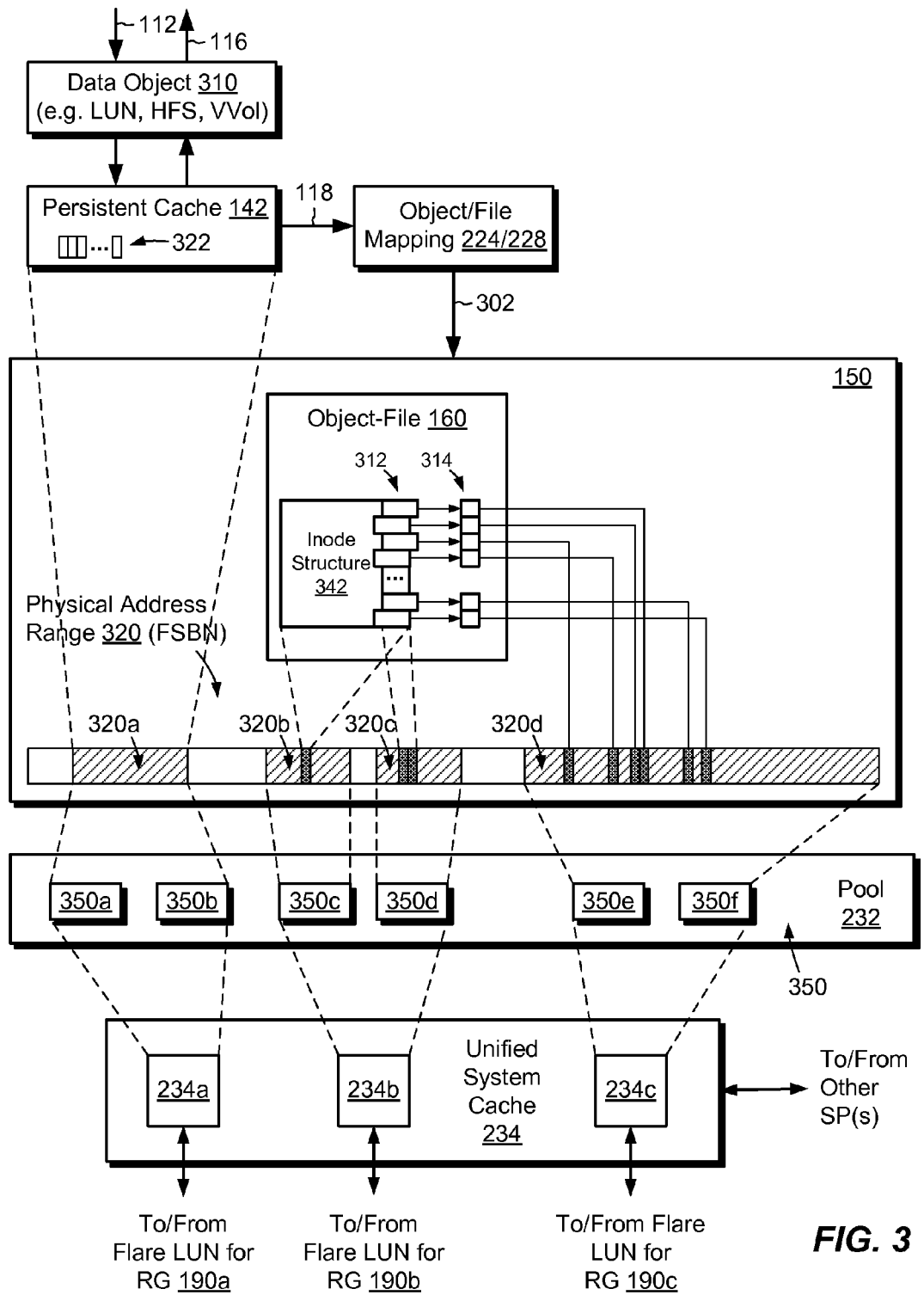
FIG. 3 is a block diagram showing example features of the IO stack of FIG. 2 in further detail, including a file system containing an object-file having a logical address space mapped to data blocks at non-contiguous physical addresses.

FIG. 3 shows portions of the front end 142 in additional detail. Here, a data object 310 represents a host-accessible object, such as a LUN, a host file system (HFS), or a VVol, for example. Persistent cache 142 stores data specified in IO requests 112 (i.e., data 322) to be written to the data object 310. Object-file mapping 224/228 (a combination of object-volume mapping 224 and volume-file mapping 228—see FIG. 2) converts the IO requests 112, which specify writes to the data object 310, to mapped IO requests 302 directed to the underlying object-file 160. As shown, the object-file 160 is a file within file system 150 (a lower-deck file system). The object-file 160 has an inode structure 342 that stores information about the object-file 160. The inode structure 342 includes an inode itself (from an inode table of the file system 150) as well as any indirect blocks needed to address the logical address space 162 (FIG. 1) of the object-file 160.

File system 150 is seen to have a physical address range 320, which may be indexed, for example, by FSBN (file system block number), where FSBN ranges from zero to some large number. In the example shown, the physical address range 320 has various subspaces, shown here with references 320a to 320d, which are supported by respective sets of slices 350 served from the storage pool 232. For example, subspace 320a is reserved for the persistent cache 142 and is backed by slices 350a and 350b. Subspace 320b is reserved for inodes and is backed by slice 350c. Subspace 320c is reserved for indirect blocks (IBs) and is backed by slice 350d, and subspace 320d is reserved for file data and is backed by slices 350e and 350f. Although each subspace is seen to be backed by an illustrated number of slices, it is understood that each subspace may be backed by any number of slices. The example shown is merely illustrative.

As indicated above, slices 350 are derived from Flare LUNs, which are expressions of respective RAID groups. In an example, the unified system cache 234 supports the underlying Flare LUNs for reads and writes, and includes different logical segments (234a, 234b, and 234c), e.g., one segment for each Flare LUN. For example, cache segment 234a supports the Flare LUN for RAID group 190a, which provides slices 350a to 350b. Similarly, cache segment 234b supports the Flare LUN for RAID group 190b, which provides slices 350c and 350d, and cache segment 234c supports the Flare LUN for RAID group 190c, which provides slices 350e to 350f.

The persistent cache 142 is supported by the unified system cache 234, which is why the persistent cache 142 is described above as an extension of the unified system cache 234. The unified system cache 234, like the persistent cache 142 of which it is a part, may be implemented using battery-backed DRAM, which is mirrored to battery-backed DRAM on the SP 120a (or on multiple other SPs).

To process IO requests 112, the persistent cache 142 receives the IO requests 112 and caches their data 322, e.g., through the subspace 320a and into the segment 234a of the unified system cache 234. During the flush operation 118, which may occur after many IO requests 112 have been cached, the file system 150 receives the accumulated data 322 in multiple mapped IO requests 302. The mapped IO requests 302 specify data 322 to be written to multiple logical addresses of the object-file 160.

The inode structure 342 in FIG. 3 shows the state of the object-file 160 prior to any remapping by the L-P mapping manager 152. Here, the inode structure 342 is seen to include block pointers 312 that point to data blocks 314 storing data of the object-file 160. The data blocks 314, which are logical structures in the depiction of FIG. 3, are stored at the physical addresses in the physical address space 320 indicated by the connecting lines. In this example, the block pointers 312 illustrated are those covering the logical addresses to which the mapped IO requests 302 are directed. Thus, the block pointers 312 should not be regarded as being necessarily contiguous or as covering any particular logical address range. Rather, they may reflect logical addresses of data specified in mapped IO requests 302 in the order the file system 150 receives them. It can also be seen that the block pointers 312 point to physical addresses in no particular pattern. Rather, the mapping between block pointers 312 and physical addresses may be arbitrary or even random. The blocks 314 are therefore likely to reside on different slices 350 and certainly on different stripes of underlying RAID groups. Thus, in this initial situation, no full-stripe writes are likely to be achieved with the block pointers 312 mapped as they appear.

In some examples, the IO stack 140 aggregates writes directed to contiguous logical addresses when performing the flushing operation 118. For example, separate and apart from the other mapping and/or remapping actions described herein, the IO stack 140 may identify writes to adjacent logical addresses of the object-file 160. Rather than separately flushing data to the file system 150 for each logical address one at a time, the IO stack 140 instead performs one flushing operation for multiple adjacent logical addresses. This aggregation of adjacent writes helps to further improve efficiency.

Figure 4:
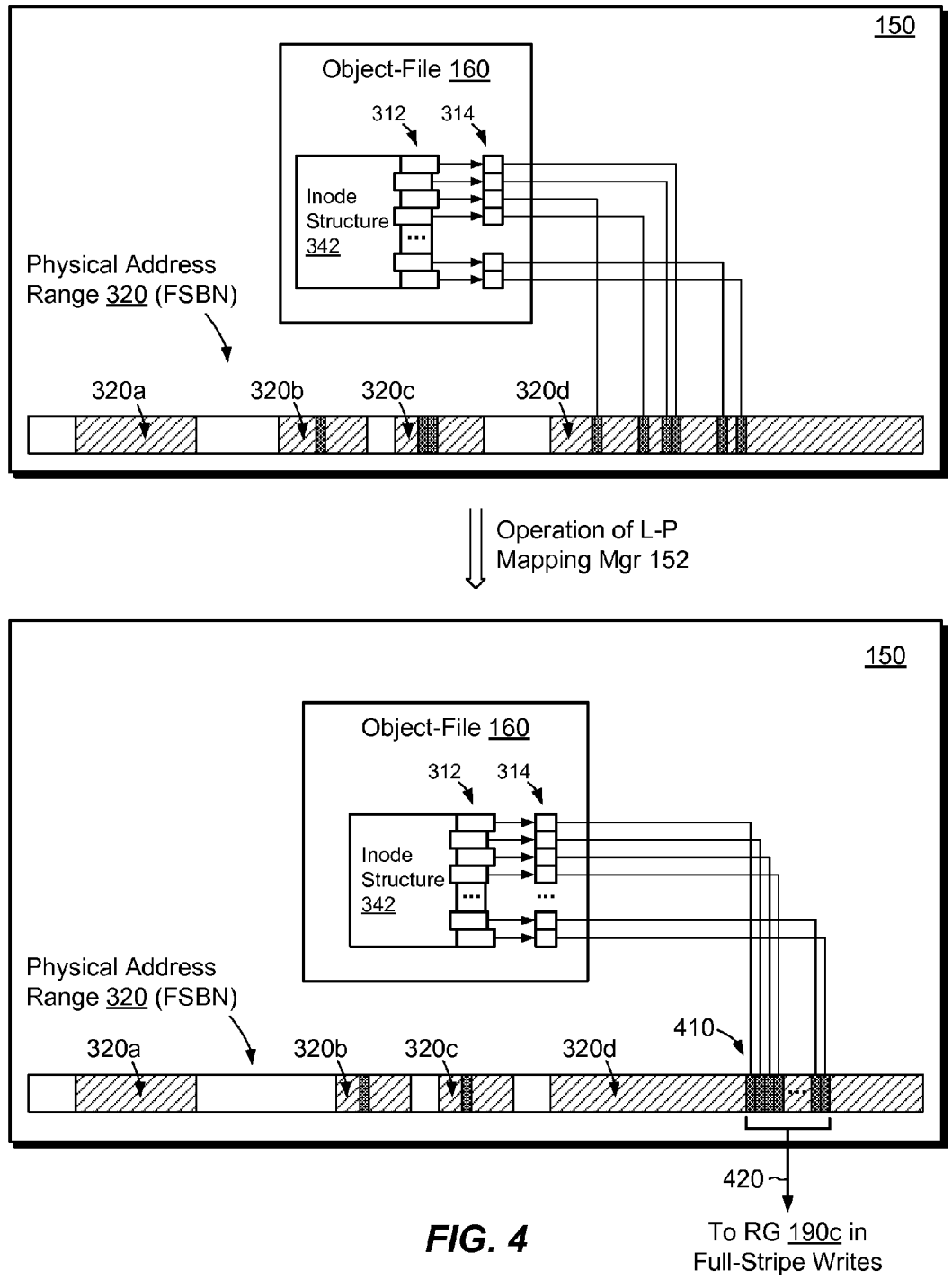
FIG. 4 is a block diagram showing the example file system of FIG. 3 before and after remapping logical addresses of the object-file to data blocks at contiguous physical addresses, to support one or more full-stripe writes to any of the RAID groups shown in FIG. 1.

FIG. 4 shows an example arrangement in which the L-P mapping manager 152 remaps the blocks specified in IO requests 302 to a contiguous range of physical addresses for promoting a full-stripe write. The depiction of the file system 150 in the top part of the figure is the same as that shown in FIG. 3, but the bottom of FIG. 4 shows the remapped blocks after operation of the L-P mapping manager 152. Here, it is seen that the file system 150 has allocated contiguous free blocks from a range of contiguous physical addresses 410. The file system 150 has copied the contents of the blocks 314 from their previous locations to the range 410 and has updated the block pointers 312 to point to the new physical addresses. The file system 150 has thus remapped the logical addresses specified in the mapped IO requests 302 to the range 410. Rather than the logical addresses mapping to data blocks at arbitrary physical addresses, as shown at the top of FIG. 4, the logical addresses instead map to data blocks at contiguous physical addresses. The range 410 of physical addresses has a size that corresponds to an integer number of full stripes, such that flushing the blocks in the range 410 to lower levels of the IO stack 140 (e.g., via flushing operation 420) induces one or more full-stripe writes.

To provide a particular example, if a RAID stripe has five segments (as shown in FIG. 1), of which four are data and one is parity, and if each segment is 64 KB in size, then the size of a full stripe is 256 KB (4*64 KB). Accordingly, the file system 150 establishes the range 410 to be the same size (e.g., 256 KB), or an integer multiple thereof. Assuming 8-KB block size, the range 410 thus includes 32 blocks (256 KB/8 KB). To write the data in the range 410 to a full stripe 196 on a RAID group, the IO stack 140 writes 8 blocks (64 KB) from the range 410 to each data segment 192 of the RAID stripe 196. The IO stack 140 also computes parity and writes 64 KB of parity to the parity segment 194 on the RAID stripe 196.

Although the examples shown in FIGS. 3 and 4 relate to overwrites, i.e., to circumstances in which blocks being written to are already mapped to physical addresses, the L-P mapping manager 152 may also be applied to allocating writes, i.e., to circumstances in which blocks being written to are not yet mapped to any physical addresses.

Figure 5:
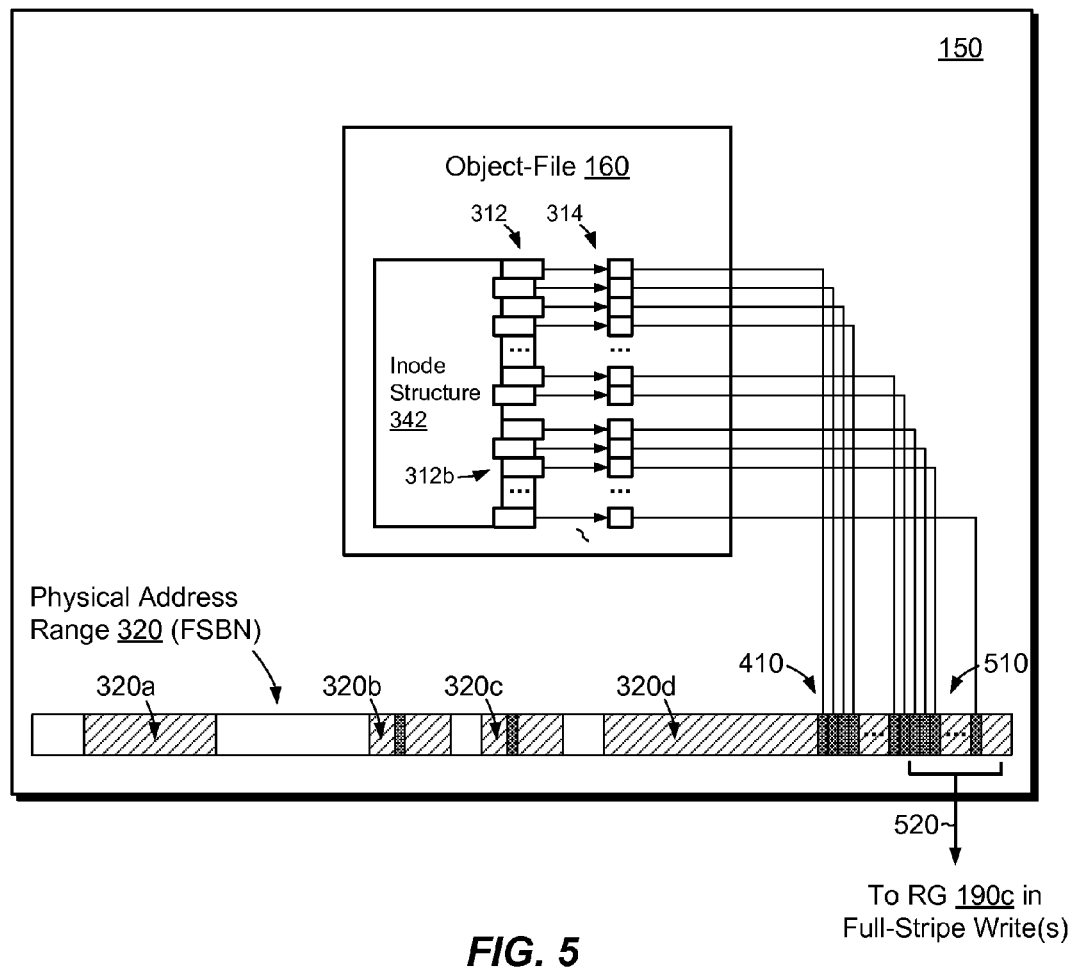
FIG. 5 is a block diagram showing the example file system of FIG. 3 after receiving an IO request that enlarges the logical address space of the object-file.

FIG. 5 shows an example arrangement in which the L-P mapping manager 152 operates for mapping allocating writes. This arrangement may arise in response to the data storage system 116 receiving additional IO requests 112 specifying new data to be written to the data object 310. To accommodate the allocating writes, the L-P mapping manager 152 directs the file system 150 to add new block pointers 312b to the inode structure 342, to enlarge the logical address space 162 of the object-file 160 and to provide block pointers for newly added data blocks. The L-P mapping manager 152 may then direct the file system 150 to allocate a new range of contiguous free blocks 312b at a contiguous range of physical addresses 510. The L-P mapping manager 152 directs the file system 150 to set the new block pointers 312b to point to the newly allocated blocks 312b in the range 510, and to write the data specified in the new IO requests 112 to the newly-allocated blocks 312b. The range 510 of physical addresses has a size that corresponds to an integer number of full stripes, such that flushing the blocks in the range 510 to lower levels of the IO stack 140 (via flushing operation 520) induces one or more full-stripe writes.

Figure 6:
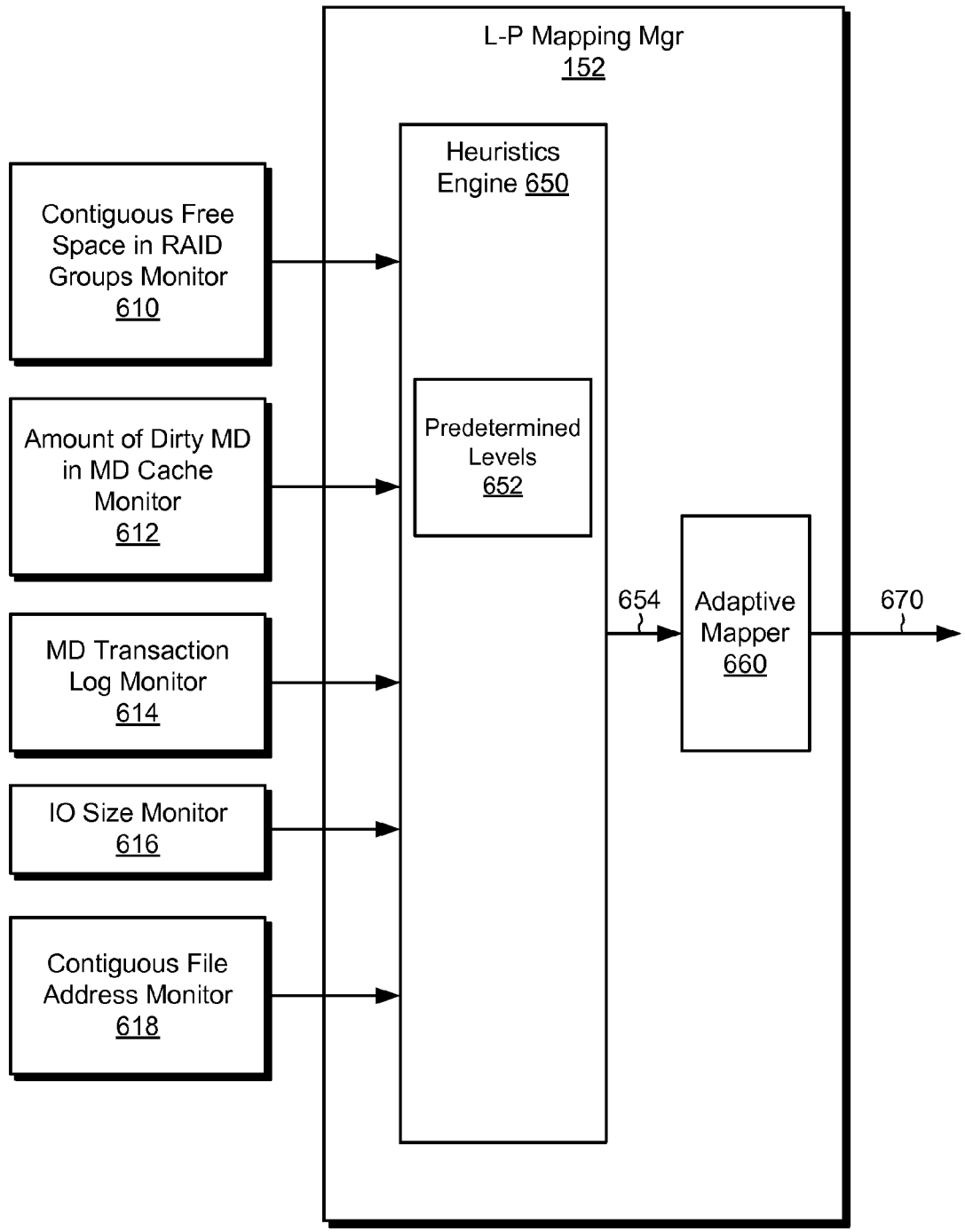
FIG. 6 is a block diagram showing the L-P mapping manager of FIG. 1 in additional detail.

FIG. 6 shows an example L-P mapping manager 152 in additional detail. Here, the L-P mapping manager 152 is seen to include a heuristics engine 650 and an adaptive mapper 660. In an example, the heuristics engine 650 receives input from various monitors (e.g., monitors 610, 612, 614, 616, and 618). The heuristics engine 650 applies these inputs to perform a decision operation, which produces a decision 654. In an example, decision 654 is a binary value that indicates whether or not the L-P mapping manager 152 should act to promote full-stripe writes. If the decision 654 evaluates to TRUE, the adaptive mapper 660 directs the file system (via direction 670) to promotes full-stripe writes, e.g., by mapping and/or remapping blocks to full-stripe-sized ranges of contiguous physical addresses. If the decision 654 evaluates to FALSE, the adaptive mapper 660 remains inactive, such that the file system 150 performs its write operations in the usual manner, i.e., without regard to optimizations for full-stripe writes.

The heuristic engine 650 may generate its decision 654 in any suitable manner. In one example, the heuristics engine 650 provides a weight for each of its inputs, multiplies each input by its respective weight, and generates a weighted sum across all weighted inputs. If the weighted sum exceeds a predetermined level (e.g., one of the levels 652), then the decision 654 evaluates to TRUE; otherwise, the decision 654 evaluates to FALSE. In other examples, the heuristics engine 152 applies a neural net, fuzzy logic, machine learning, combinatorial logic, conditional logic, and/or other machine-implemented decision techniques or combination of techniques.

Regardless of the particular technology applied, example operation of the heuristics engine 650 may include the following:

If a contiguous free space monitor 610 indicates that the contiguous free space in RAID groups falls below a predetermined level (e.g., one of the levels 652), the heuristics engine 650 causes, or contributes to causing, the decision 654 to evaluate to FALSE. Thus, for example, when the RAID group 190c includes many free full stripes, the adaptive mapper 660 may direct the file system 150 to promote full-stripe writes. But when the RAID group 190c includes few or no full stripes, the mapper 660 may remain inactive, and mapping may proceed without regard to full-stripe writes. This decision reflects the fact that remapping, which comes at a cost in terms of file system activity, should not be performed when the data storage system 116 is currently unable to support full-stripe writes.

If a monitor 612 tracking the amount of dirty metadata in metadata cache of the file system 150 exceeds a predetermined level (e.g., one of the levels 652), the heuristics engine 650 causes, or contributes to causing, the decision 654 to evaluate to FALSE. Thus, for example, when the file system 150 is already operating under a heavy workload of metadata processing, the adaptive mapper 660 may direct the file system 150 to back off of promoting full-stripe writes. But when the amount of dirty metadata is less, reflecting less vigorous file system activity, the mapper 660 may direct the file system 150 to promote full-stripe writes, as the file system 150 may have available capacity for assuming the additional workload.

If a monitor 614 tracking the number of pending metadata transactions in a file system transaction log exceeds a predetermined level (e.g., one of the levels 652), the heuristics engine 650 causes, or contributes to causing, the decision 654 to evaluate to FALSE. Thus, for example, when the file system 150 already has many metadata transactions queued for processing, the adaptive mapper 660 may direct the file system 150 to back off of promoting full-stripe writes. But when the number of pending metadata transactions is less, the mapper 660 may direct the file system 150 to promote full-stripe writes, as the file system 150 has the capacity to handle the additional workload.

If a monitor 616 tracking the IO size of data specified in IO requests 112 indicates that an arriving IO request has a size that exceeds a predetermined level (e.g., one of the levels 652), and at the same time a contiguous file address monitor 618 indicates that the logical address range of the file to which the large IO request is directed is already mapped to contiguous physical addresses, then the heuristics engine 650 causes, or contributes to causing, the decision 654 to evaluate to FALSE. As the arriving IO is already mapped to contiguous physical space, there is no need to remap it. Thus, the adaptive mapper 660 may remain inactive in these situations, as no further action is required to promote full-stripe writes.

Figure 7:
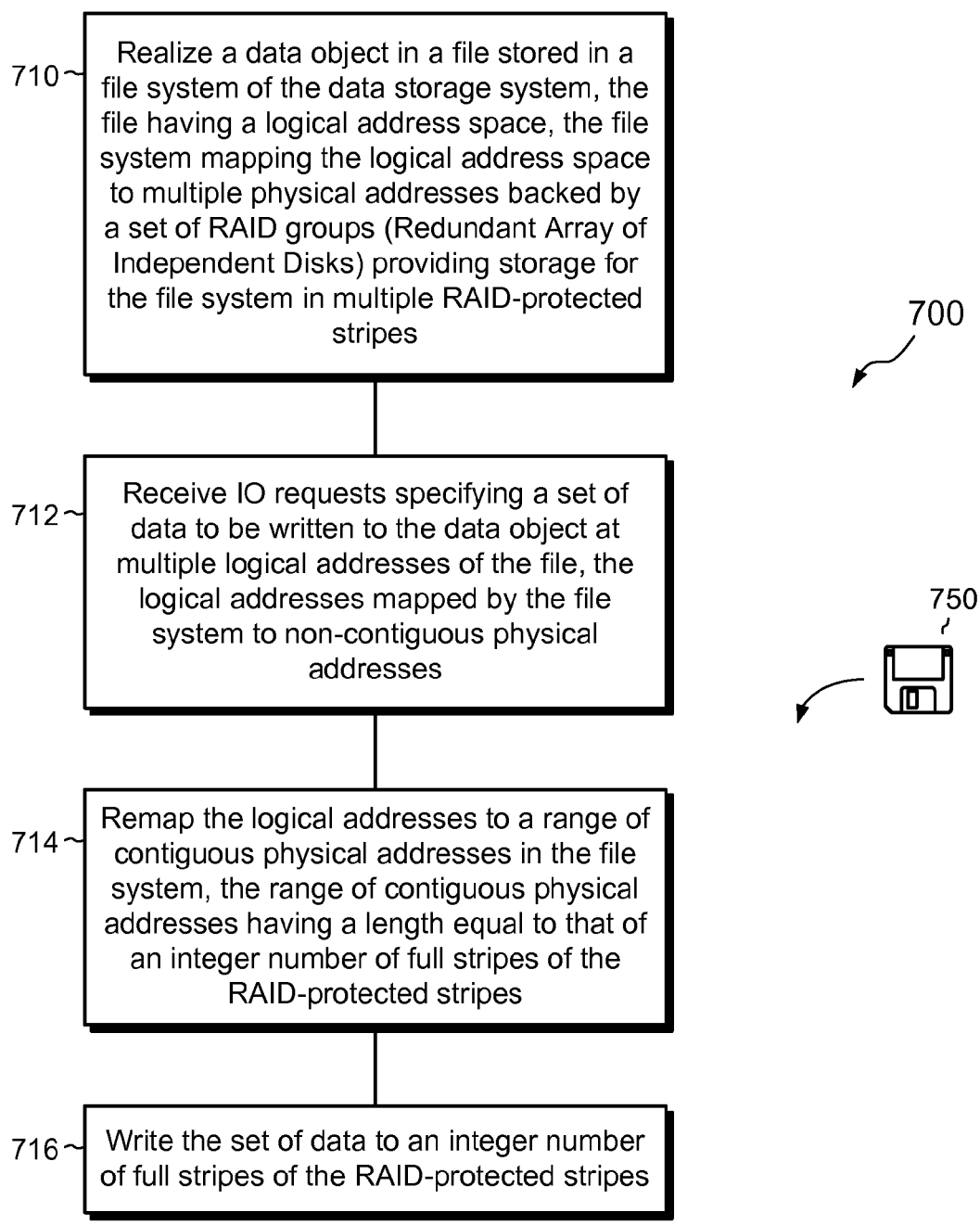
FIG. 7 is a block diagram showing an example process for managing storage of a data object in a data storage system, such as the one shown in FIG. 1.

FIG. 7 shows an example process 700 for managing storage for a data object in a data storage system and provides a summary of some of the material presented above. The process 700 may be performed by the software constructs described in connection with FIGS. 1-6, which reside in the memory 130 of the storage processor 120 and are run by the set of processing units 124. The various acts of the process 700 may be ordered in any suitable way. Accordingly, embodiments may be constructed in which acts are performed in orders different from those illustrated, which may include performing some acts simultaneously, even though the acts are shown as sequential in the illustrated embodiments.

At 710, a data object is realized in a file stored in a file system of the data storage system. The file has a logical address space. The file system maps the logical address space to multiple physical addresses backed by a set of RAID groups (Redundant Array of Independent Disks) providing storage for the file system in a set of RAID-protected stripes. For example, as shown in FIG. 1, the data storage system 116 realizes a data object, such as a LUN, a host file system, or a VVol, in the object-file 160, which is part of a lower-deck file system 150. The object-file 160 has a logical address space 160, e.g., which corresponds to logical offsets into the file. The file system 150 maps the logical address space 162 to physical addresses 164 (see also FIG. 3). The physical addresses 164 are backed by a set of RAID groups (e.g., by RAID group 190a—see FIG. 3), which provide storage in the form of stripes 196, e.g., as shown with data segments 192 and parity segments 194.

At 712, IO requests are received that specify a set of data to be written to the data object at multiple logical addresses of the file. The logical addresses of the file are mapped by the file system to non-contiguous physical addresses. For example, as shown in FIG. 3, IO requests 112 specify data, which is accumulated as a set of data 322, to be written to multiple logical addresses of the data object 310. The IO stack 140 converts these IO requests 112 to mapped IO requests 302, which specify data to be written to multiple logical addresses of the object-file 160. The file system 150 maps these logical addresses to non-contiguous physical addresses, as shown by the arbitrary mapping to physical addresses within the subspace 320d.

At 714, logical addresses are remapped to a range of contiguous physical addresses in the file system. The range of contiguous physical addresses has a length equal to that of a full stripe of the set of RAID-protected stripes. For example, as shown at the bottom of FIG. 4, operation of the L-P mapping manager 152 has remapped the blocks 314 at logical addresses indicated by block pointers 312 to range 410 of contiguous physical addresses. The length of contiguous physical addresses 410 has a length equal to that of a full stripe write. For example, if a full stripe has a size of 256 KB and each block has a size of 8 KB, then the range 410 includes 32 blocks.

At 716, parity is computed for the set of data and the set of data and the parity are written to a full stripe of the set of RAID-protected stripes. For example, lower levels of the IO stack 140 compute parity for the blocks 314 in the range 420. The IO stack 140 then writes data to data segments 192 (FIG. 1) of a RAID stripe 196 and writes parity to one or more parity segments 194.

An improved technique has been described for managing data storage in a data storage system. The technique includes receiving IO requests specifying data to be written at different logical addresses and mapping the specified data to contiguous physical addresses, so as to produce contiguously-mapped data having a length equal to that of a full stripe of a RAID group. With data from the IO requests mapped to a contiguous, full-stripe range of physical addresses, the data storage system can write the data and its parity to the full stripe of the RAID Group all at once. This coalescing of data into full-stripe writes utilizes disk drives more efficiently and greatly reduces the number of disk accesses required to maintain parity. For example, rather than the data storage system having to write a parity segment for each IO request, the data storage system can instead write the parity once for all of the IO requests. Thus, the improved technique greatly reduces the number of disk accesses for maintaining parity and allows the disk drives in RAID groups to spend more of their IO capacity on servicing host requests and less on maintaining parity. Overall disk utilization is therefore increased without the need to incorporate additional disk drives.

Having described certain embodiments, numerous alternative embodiments or variations can be made. For example, although embodiments have been described writing a full stripe of data at a time, there is no requirement that stripes be completely filled with data. Thus, for example, full-stripe writes can include less data than that required to fill the stripes completely.

Also, although the illustrated examples provide RAID groups each including multiple disk drives, it is understood that a RAID group can be constructed with a single disk drive, e.g. by using different platters or portions of the disk drive. Therefore, the RAID groups as disclosed herein do not require multiple disk drives.

Also, the disk drives need not be magnetic disk drives. For example, RAID groups may be composed from electronic flash drives, optical drives, or even from semiconductor memory. Thus, embodiments hereof are not limited to any particular type of storage media.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 750 in FIG. 7). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Although certain embodiments are disclosed herein, it is understood that these are provided by way of example only and the invention is not limited to these particular embodiments.

Those skilled in the art will therefore understand that various changes in form and detail may be made to the embodiments disclosed herein without departing from the scope of the invention.

What is claimed is:

1. A method of managing storage for a data object in a data storage system, the method comprising:
realizing the data object in a file stored in a file system of the data storage system, the file having a logical address space, the file system mapping the logical address space to multiple physical addresses backed by a set of RAID groups (Redundant Array of Independent Disks) providing storage for the file system in a set of RAID-protected stripes;
receiving IO requests specifying a set of data to be written to the data object at multiple logical addresses of the file, the logical addresses mapped by the file system to non-contiguous physical addresses;

remapping the logical addresses to a range of contiguous physical addresses in the file system, the range of contiguous physical addresses having a length equal to that of a full stripe of the set of RAID-protected stripes;

computing parity for the set of data; and writing the set of data and the parity to a full stripe of the set of RAID-protected stripes, wherein remapping the logical addresses of the file is performed prior to storing the set of data in the set of RAID groups, such that a first write of the set of data to the set of RAID groups is to the range of contiguous physical addresses.

2. The method of claim 1, wherein each of the IO requests specifies host data to be written to the data object, and wherein the method further comprises, prior to remapping the logical addresses:

persisting the host data specified by each of the IO requests in a persistent cache; and acknowledging completion of each of the IO requests after persisting the host data specified by the respective IO requests in the persistent cache.

3. The method of claim 2, further comprising, after acknowledging completion of each of the IO requests, allocating data blocks to the file system in the range of contiguous physical addresses.

4. The method of claim 3, wherein the file in which the data object is realized has an inode structure including a set of block pointers, the set of block pointers pointing to an initial set of data blocks storing data of the file prior to remapping, and wherein remapping the logical addresses includes changing the set of block pointers in the inode structure of the file to point from the initial set of data blocks to the allocated data blocks in the range of contiguous physical addresses.

5. The method of claim 4, wherein the method further comprises:

monitoring contiguous free space in the set of RAID-protected stripes;

receiving additional IO requests specifying a second set of data to be written to the data object at a set of logical addresses within the logical address space of the file, the inode structure mapping the set of logical addresses to a set of non-contiguous physical addresses; and in response to the contiguous free space falling below a predetermined level, writing the second set of data in place at the set of non-contiguous physical addresses.

6. The method of claim 4, wherein the method further comprises:

monitoring an amount of dirty metadata in a metadata cache of the file system;

receiving additional IO requests specifying a second set of data to be written to the data object at a set of logical addresses within the logical address space of the file, the inode structure mapping the set of logical addresses to a set of non-contiguous physical addresses; and in response to the amount of dirty metadata in the metadata cache exceeding a predetermined level, writing the second set of data in place at the set of non-contiguous physical addresses.

7. The method of claim 4, wherein the method further comprises:

monitoring a number of file system metadata transactions pending in a metadata transaction log of the file system;

receiving additional IO requests specifying a second set of data to be written to the data object at a set of logical addresses within the logical address space of the file, the inode structure mapping the set of logical addresses to a set of non-contiguous physical addresses; and in response to the number of pending metadata transactions exceeding a predetermined level, writing the second set of data in place at the set of non-contiguous physical addresses.

8. The method of claim 4, wherein the method further comprises:

receiving an additional IO request specifying a second set of data to be written to the data object at a set of logical addresses within the logical address space of the file, the inode structure mapping the set of logical addresses to a set of contiguous physical addresses, the set of contiguous physical addresses having a length at least as great as that of one full stripe of the set of RAID-protected stripes; and in response to a size of the second set of data exceeding a predetermined level, writing the second set of data in place at the set of contiguous physical addresses.

9. The method of claim 4, wherein, in response to additional IO requests, the acts of remapping and writing are preformed selectively based on multiple factors, the multiple factors including available contiguous storage space on the set of RAID-protected stripes and a current metadata processing workload handled by the file system.

10. The method of claim 4, further comprising:

receiving additional IO requests specifying a second set of data to be written to the data object;

adding new block pointers to the inode structure of the file to accommodate the second set of data;

allocating new data blocks to the file system at a set of contiguous physical addresses;

mapping the new block pointers to point to the new data blocks at the set of contiguous physical addresses; and writing the second set of data to an integer number of full stripes of the set of RAID-protected stripes.

11. The method of claim 10, further comprising:

persisting the second set of data in the persistent cache;

identifying data from the second set of data that are directed to contiguous logical addresses of the file;

aggregating the identified data to produce aggregated data having a length equal to that of an integer number of data blocks; and flushing the aggregated data from the persistent cache to the file system in a single flushing operation.

12. The method of claim 4, wherein the data object realized in the file is one of a file system, a LUN (Logical Unit Number), and a VVol (virtual volume).

13. The method of claim 4, wherein the persistent cache includes DRAM (Dynamic Random Access Memory) that is battery backed-up and redundantly mirrored across multiple storage processors of the data storage system.

14. The method of claim 1, wherein the set of data is received from a host, and wherein the method further comprises, upon receiving the IO requests, temporarily storing the set of data in a data log; and in response to the set of data being stored in the data log, acknowledging receipt of the set of data to the host, wherein remapping the logical addresses is performed after acknowledging receipt to the host, while the set of data are stored in the data log, and before the set of data has ever been written to the set of RAID groups, and wherein writing the set of data and the parity includes flushing the set of data from the data log to the range of contiguous physical addresses in the file system.

15. A computerized apparatus, comprising a set of processing units and memory, coupled to the set of processing units, the memory storing instructions which, when executed by the set of processing units, cause the set of processing units to:

realize a data object in a file stored in a file system, the file having a logical address space, the file system mapping the logical address space to multiple physical addresses backed by a set of RAID groups (Redundant Array of Independent Disks) providing storage for the file system in a set of RAID-protected stripes;

receive IO requests specifying a set of data to be written to the data object at multiple logical addresses of the file, the logical addresses mapped by the file system to non-contiguous physical addresses;

in response to receiving the IO requests to write the set of data, remap the logical addresses to a range of contiguous physical addresses in the file system, the range of contiguous physical addresses having a length equal to that of a full stripe of the set of RAID-protected stripes; and compute parity for the set of data; and write the set of data and the parity to a full stripe of the set of RAID-protected stripes, wherein the instructions cause the control circuitry to remap the logical addresses of the file prior to storing the set of data in the set of RAID groups, such that a first write of the set of data to the set of RAID groups is to the range of contiguous physical addresses.

16. The computerized apparatus of claim 15, wherein the memory includes a persistent cache, the persistent cache including DRAM (Dynamic Random Access Memory) that is battery backed-up and redundantly mirrored across multiple storage processors of the computerized apparatus, wherein each of the IO requests specifies host data to be written to the data object, and wherein the instructions further cause the set of processing units to, prior to remapping the logical addresses:

persist the host data specified by each of the IO requests in a persistent cache; and acknowledge completion of each of the IO requests after persisting the host data specified by the respective IO requests in the persistent cache.

17. A non-transitory, computer-readable medium including instructions which, when executed by a set of processing units of a computerized apparatus, cause the set of processing units to perform a method for managing storage for a data object, the method comprising:

realizing the data object in a file stored in a file system, the file having a logical address space, the file system mapping the logical address space to multiple physical addresses backed by a set of RAID groups (Redundant Array of Independent Disks) providing storage for the file system in a set of RAID-protected stripes;

receiving IO requests specifying a set of data to be written to the data object at multiple logical addresses of the file, the logical addresses mapped by the file system to non-contiguous physical addresses;

in response to receiving the IO requests to write the set of data, remapping the logical addresses to a range of contiguous physical addresses in the file system, the range of contiguous physical addresses having a length equal to that of a full stripe of the RAID-protected stripes;

computing parity for the set of data; and writing the set of data and the parity to a full stripe of the set of RAID-protected stripes, wherein remappinq the logical addresses of the file is performed prior to storing the set of data in the set of RAID groups, such that a first write of the set of data to the set of RAID groups is to the range of contiguous physical addresses.

18. The non-transitory, computer-readable medium of claim 17, wherein each of the IO requests specifies host data to be written to the data object, and wherein the method further comprises, prior to remapping the logical addresses:

persisting the host data specified by each of the IO requests in a persistent cache;

acknowledging completion of each of the IO requests after persisting the host data specified by the respective IO requests in the persistent cache; and allocating data blocks to the file system in the range of contiguous physical addresses, wherein the file in which the data object is realized has an inode structure including a set of block pointers, the set of block pointers pointing to an initial set of data blocks storing data of the file prior to remapping, and wherein remapping the logical addresses includes changing the set of block pointers in the inode structure of the file to point from the initial set of data blocks to the allocated data blocks in the range of contiguous physical addresses.

19. The non-transitory, computer-readable medium of claim 18, wherein, in response to additional IO requests, the acts of remapping and writing are preformed selectively based on multiple factors, the multiple factors including available contiguous storage space on the set of RAID-protected stripes and a current metadata processing workload handled by the file system.

20. The non-transitory, computer-readable medium of claim 19, wherein the method further comprises:

receiving additional IO requests specifying a second set of data to be written to the data object;

adding new block pointers to the inode structure of the file to accommodate the second set of data;

allocating new data blocks to the file system at a set of contiguous physical addresses;

mapping the new block pointers to point to the new data blocks at the set of contiguous physical addresses; and writing the second set of data to an integer number of full stripes of the set of RAID-protected stripes.

21. The non-transitory, computer-readable medium of claim 20, wherein the data object realized in the file is one of a file system, a LUN (Logical Unit Number), and a VVol (virtual volume).

* * * * *